(12) United States Patent
Peng et al.

(10) Patent No.: US 11,320,597 B1
(45) Date of Patent: May 3, 2022

(54) OPTICAL DEVICE

(71) Applicant: BROWAVE CORPORATION, Hsin-Chu (TW)

(72) Inventors: Chang-Yi Peng, Taoyuan (TW); Yu-Wen Hwang, Hsinchu County (TW)

(73) Assignee: BROWAVE CORPORATION, Hsin-Chu (TW)

( * ) Notice: Subject to any disclaimer, the term of this patent is extended or adjusted under 35 U.S.C. 154(b) by 0 days.

(21) Appl. No.: 17/162,495

(22) Filed: Jan. 29, 2021

(51) Int. Cl.
*G02B 6/293* (2006.01)

(52) U.S. Cl.
CPC ....... *G02B 6/29361* (2013.01); *G02B 6/2938* (2013.01); *G02B 6/29397* (2013.01); *G02B 6/29398* (2013.01)

(58) Field of Classification Search
CPC .............. G02B 6/29361; G02B 6/2938; G02B 6/29397; G02B 6/29398
See application file for complete search history.

(56) References Cited

U.S. PATENT DOCUMENTS

| | | | |
|---|---|---|---|
| 6,647,177 B1 | 11/2003 | Hwang et al. | |
| 2002/0171936 A1 | 11/2002 | Ockenfuss et al. | |
| 2003/0099038 A1* | 5/2003 | Takahashi | G02B 5/288 |
| | | | 359/589 |
| 2003/0138194 A1* | 7/2003 | Hwang | G02B 6/2938 |
| | | | 385/24 |
| 2004/0067014 A1 | 4/2004 | Hollars et al. | |
| 2008/0231778 A1* | 9/2008 | Tsao | G02F 1/133516 |
| | | | 349/106 |

FOREIGN PATENT DOCUMENTS

| | | | | |
|---|---|---|---|---|
| CA | 2736292 A1 | * | 3/2010 | ......... G02B 27/1073 |
| CN | 102253537 A | * | 11/2011 | ........... G02F 1/1339 |
| TW | 561283 B | | 11/2003 | |
| TW | 200407556 A | | 5/2004 | |
| TW | I248529 B | | 2/2006 | |
| TW | I298396 B | | 7/2008 | |
| TW | I298582 B | | 7/2008 | |
| TW | 202032166 A | | 9/2020 | |

OTHER PUBLICATIONS

Taiwan Office Action and Search Report with English translation of TW family patent Application No. 110108587, dated Feb. 14, 2022, 7 pages.

\* cited by examiner

*Primary Examiner* — Daniel Petkovsek
(74) *Attorney, Agent, or Firm* — Muncy, Geissler, Olds & Lowe, P.C.

(57) ABSTRACT

An optical device is provided. The optical device includes a substrate and a plurality of filters. The plurality of filters are disposed over the substrate. Each of the filters includes a support body, a filter layer, and a centrosymmetric spacer. The support body has a first side surface and a second side surface opposite to the first side surface. The filter layer is on the first side surface. The spacer is attached to the first side surface by a second adhesive layer on the first side surface. The centrosymmetric spacer is attached to the filter layer, at least a peripheral portion of the filter layer is free from being covered by the centrosymmetric spacer.

20 Claims, 9 Drawing Sheets

OPTICAL DEVICE

FIELD

The present disclosure relates to an optical device, particularly, the optical device has a Dense Wavelength-division multiplexing (DWDM) filter structure that having a good and stable performance in Central Wavelength Shifting (CWTS) and Polarization Dependent Loss (PDL) under a wide operating temperature; for example, within the industrial-grade range.

BACKGROUND

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM assemblies and associated devices can be used as components in an optical network.

Generally, a WDM transport system can fully utilize the bandwidth and increase the transmission capacity of an optical free-space link. A free-space WDM transport system that uses different optical channels (wavelengths) to carry the data signal would be quite useful for the optical free-space link to provide both data and telecommunication services. Free space optics is a line of sight communication systems using air or vacuum as the medium of propagation. It uses unguided media to potentially offer wide bandwidth and at the same time supporting high data rate, comparable to the optic fiber, making it highly attractive in meeting the increasing broadband traffic.

BRIEF DESCRIPTION OF THE DRAWINGS

Aspects of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1A:
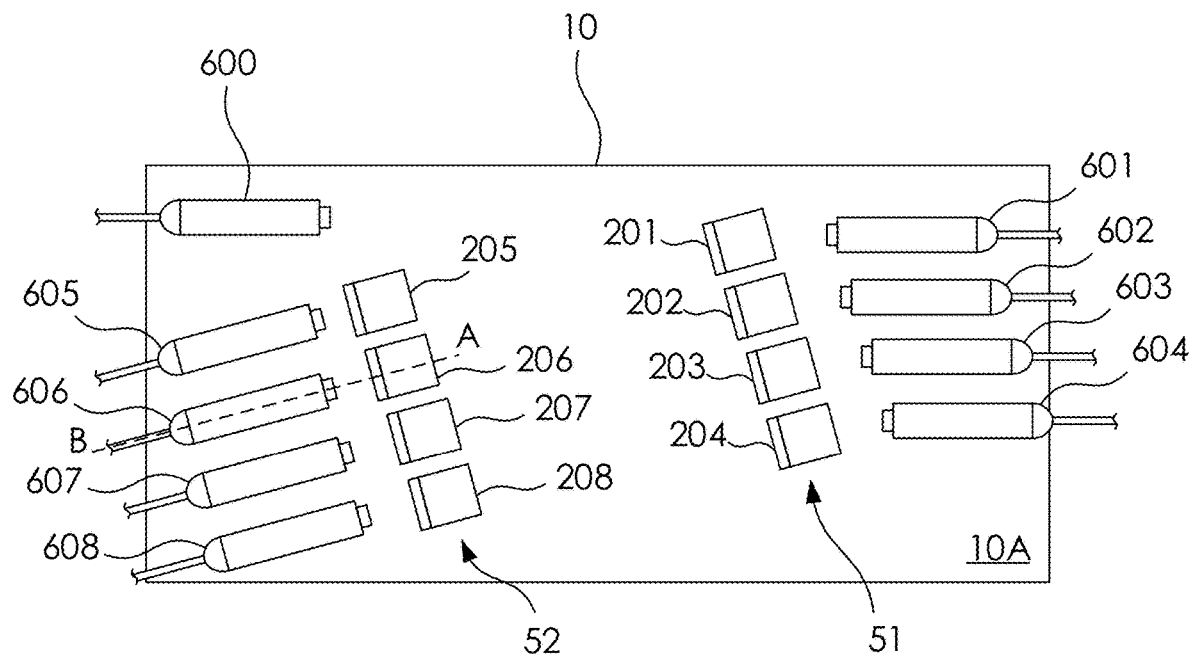
FIG. 1A illustrates a top view of an optical device according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. The terms such as "first", "second", and "third" when used herein do not imply a sequence or order unless clearly indicated by the context.

Dense wavelength division multiplexing (DWDM) is a fiber-optic transmission technique. It involves the process of multiplexing many different wavelength signals onto a single fiber, while each fiber has a set of parallel optical channels and each one uses slightly different light wavelengths. The fibers may employ light wavelengths to transmit data parallel-by-bit or serial-by-character. DWDM is a very crucial component of optical networks that will allow the transmission of data The filter in DWDM is an important component for optical communication, however, DWDM filter is sensitive in wavelength shift, for example, the wavelength may be shifted when the DWDM filter is working under a higher or a lower temperature and/or the mechanical properties such as the stress exists. Due to the harsh working environment and the stress, the wavelength shift is generated and make the DWDM filter ineffective. Generally, in a free space DWDM system, each of the DWDM filters includes a DWDM thin film laterally supported by a glass substrate or a glass ceramic substrate. Since the DWDM filters arranged in the optical device are diced from a raw unit into a plurality of tiny pieces to fulfill the microminiaturization requirement of the optical device, each of the tiny glass substrates may suffer tension from an adhesive layer there below and a side surface of the glass substrate coated by the DWDM thin film may have a convex profile due to stress accordingly. Such deformation of the DWDM filters may be aggravated under a low operating temperature such as lower than 0° C., and both of the central wavelength shifting (CWTS) and the polarization dependent loss (PDL) are thus increased.

Accordingly, some embodiments of the present disclosure provide an optical device which may alleviate the issues of CWTS and PDL that induced by the change of the operating temperature or the stress in the DWDM filter. In some embodiments, a spacer and/or a stress balance mechanism may be employed to the DWDM filter. Through utilizing the spacer and/or the stress balance mechanism, the CWTS of the DWDM filter may be controlled to within ±0.03 nm under an operating temperature in an industrial-grade range, that is, from about −40° C. to about 85° C. Likewise, the PDL may be controlled to be less than about 0.1 dB under the abovementioned industrial-grade range of the operating temperature.

Figure 1B:
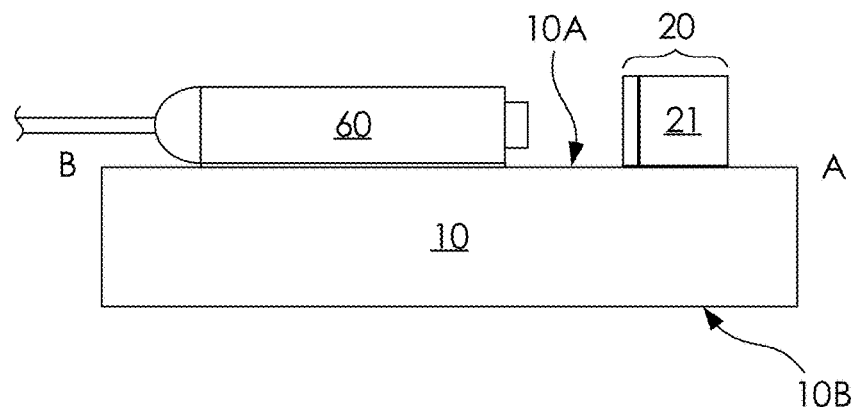
FIG. 1B illustrates a cross sectional view of an optical device according to some embodiments of the present disclosure.

FIGS. 1A and 1B illustrates an optical device according to some embodiments of the present disclosure and a cross sectional view along line AB, respectively. In some embodiments, the optical device in the present disclosure is at least a portion of the free space DWDM system. The optical device includes a substrate 10 and a plurality of filters 20. The substrate 10 includes an upper surface 10A and a lower surface 10B opposite to the upper surface 10A, and the plurality of filters 20 are disposed over the upper surface 10A of the substrate 10. In some embodiments, the plurality of the filters 20 are arranged over the substrate 10 in a first array 51 (e.g., including filters 201-204) and a second array 52 (e.g., including filters 205-208) substantially parallel to the first array. Furthermore, the optical device may include a plurality of collimators 60 (e.g., including 600-608) disposed over the substrate 10, and the plurality of collimators 60 are aligned to each of the plurality of the filters 20, respectively.

Based on such structure, the light emitted from the collimator 600 may firstly pass through the filter 201, and a transmitted light with a selected wavelength may be received by the collimator 601 which in proximate to a side of the filter 201, and the transmitted light is guided to the connected optical fiber accordingly. Meanwhile, a reflected light with other wavelengths may be reflected by the filter 201 to filter 205, which is the first filter in the second array 52. Likewise, a specific wavelength of the reflected light may transmit the filter 205 and received by the collimator 606, whereas the non-transmitted light is being reflected to the filter 202 in the first array 51, and so on. Accordingly, different wavelengths of the light emitted from the collimator 600 may be separated by different filters 201-208 and be guided to different optical fibers through the collimators 601-608 during the light is being reflected continuously and may travel along a zig zag route within the space between the first array 51 and the second array 52.

Figure 2:
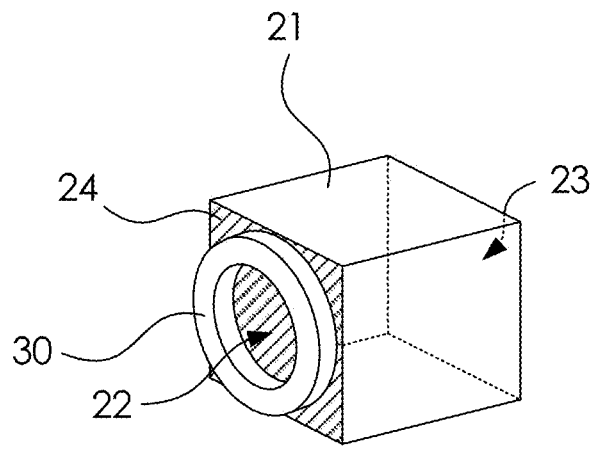
FIG. 2 depicts a three dimensional illustration of a filter according to some embodiments of the present disclosure.
Figure 3:
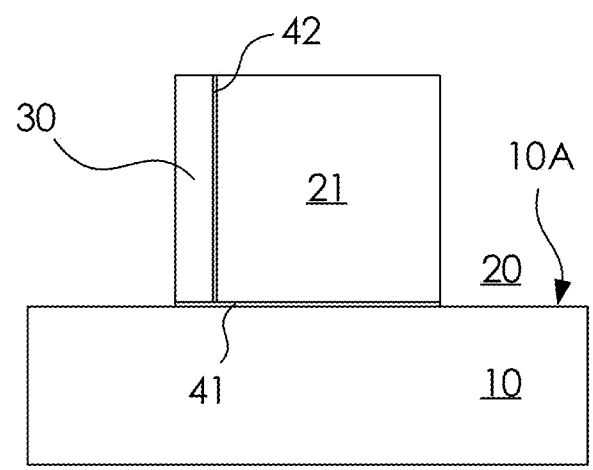
FIG. 3 illustrates a side view of a portion of an optical device according to some embodiments of the present disclosure.

Referring to FIG. 2, in some embodiments, each of the filters 20 includes a support body 21 and a spacer 30. The support body 21 is transparent and may be made by a wide variety of materials including glass, quartz, optical plastic, silicon, etc., and generally, the shape of the support body 21 is cuboid or rectangular parallelepiped. As shown in FIG. 3, the support body 21 may have a bottom surface in contact with a first adhesive layer 41 which is sandwiched by the support body 21 and the substrate 10, and therefore the support body 21 is fixed over the upper surface 10A of the substrate 10.

Figure 4A:
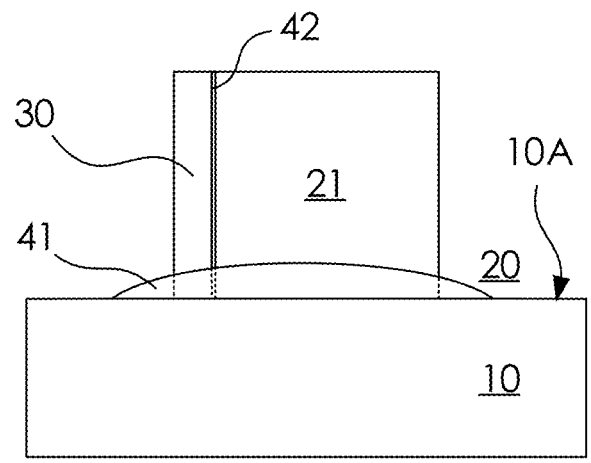
FIG. 4A illustrates a side view of a portion of an optical device according to some embodiments of the present disclosure.
Figure 4B:
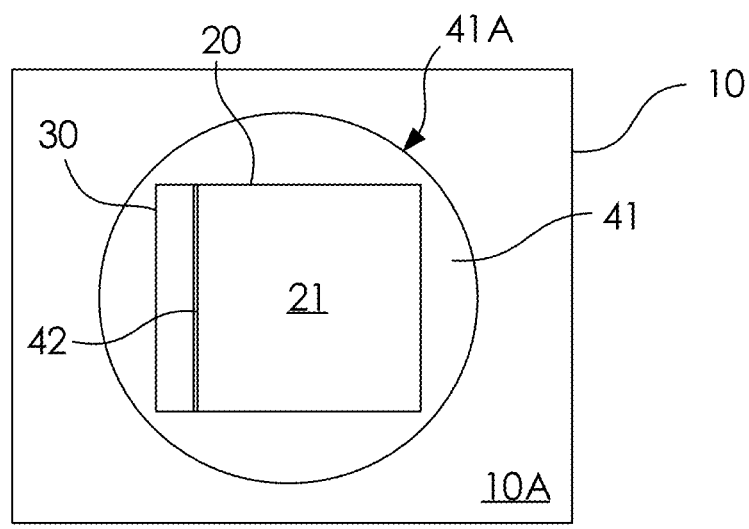
FIG. 4B illustrates a top view of a portion of an optical device according to some embodiments of the present disclosure.

In some alternative embodiments, the bottom surface of the support body 21 is free from in contact with the first adhesive layer 41. For example, referring to the side view illustrated in FIG. 4A, the bottom surface of the support body 21 is in contact with the upper surface 10A of the substrate 10, while the first adhesive layer 41 is in contact with a lower side portion of the support body 21. Accordingly, the lower side portion of the support body 21 is surrounded by the first adhesive layer 41, and the support body 21 is fixed over the substrate 10 thereby. In such embodiments, referring to the top view illustrated in FIG. 4B, the first adhesive layer 41 may have an outer edge 41A surrounding the support body 21. In other embodiments, the first adhesive layer 41 may be disposed below the support body 21 and in contact the lower side portion of the support body 21 as well, depending on the sticking technique of the support body 21. Furthermore, the first adhesive layer 41 may further in contact with the spacer 30.

As shown in previously mentioned FIG. 2, the support body 21 has a first side surface 22 and a second side surface 23 opposite to the first side surface 22. In some embodiments, a filter layer 24 is coated on the first side surface 22 of the support body 21. The filter layer 24 is a thin film which may include a plurality of sublayers made by different materials. In some embodiments, the filter layer 24 includes sublayers made by silicon dioxide ($SiO_2$), tantalum pentoxide ($Ta_2O_5$), titanium dioxide ($TiO_2$), aluminum oxide ($Al_2O_3$), hafnium dioxide ($HfO_2$), zirconium dioxide ($ZrO_2$), or combination thereof. In some embodiments, the filter layer 24 which includes sublayers made by different materials are alternately deposited one on another to form a stack. In some embodiments, the filter layer 24 includes a plurality of alternating sublayers of high-refractive-index and low-refractive-index materials deposited on the first side surface 22 of the support body 21. Typically, the feature of the filter layer 24 is based on the wavelength-dependent interference of light reflected or transmitted at the many interfaces between the sublayers. In addition, based on the applications of the filter layer 24, the filter layer 24 may be called a WDM thin film or a DWDM thin film, depending on the application scenarios.

Generally, the thickness of the filter layer 24 is too thin to independently stand over the substrate 10, and therefore the filter layer 24 is coated on the first side surface 22 of the support body 21. However, comparing with the thickness of the support body 21, the thickness of the filter layer 24 is non-negligible and since the filter layer 24 is coated on the support body 21, the filter layer 24 may induce stress in the support body 21, and the optical properties of the support body 21 may be affected thereby. Furthermore, the support body 21 with the filter layer 24 is also sensitive to the change of the temperature; for example, the structure of a raw filter (i.e., only includes the support body 21 with the filter layer 24) may expand upon heating and contract on the contrary obviously.

Figure 5:
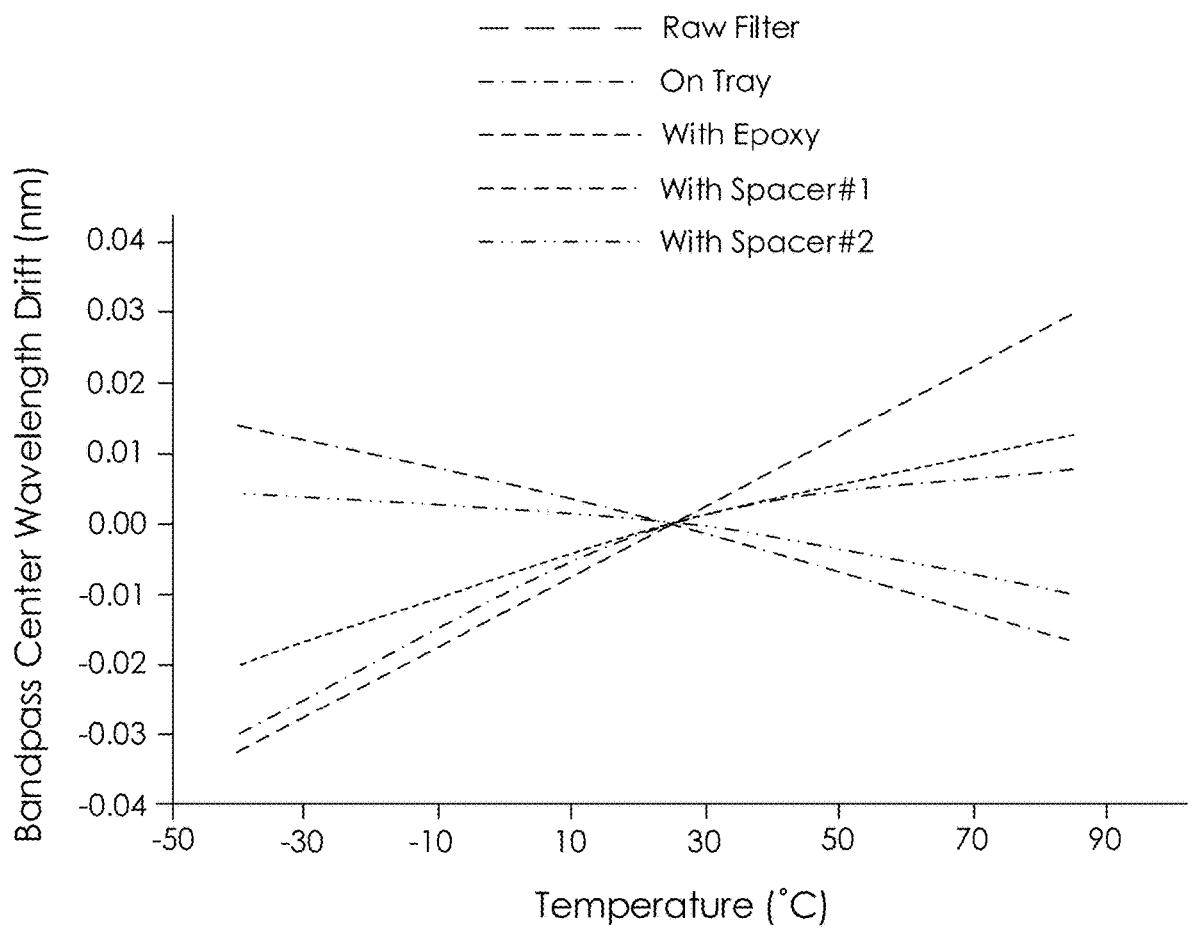
FIG. 5 illustrates a chart of CWTS with respect to temperatures for various filters according to some embodiments of the present disclosure.

For example, as shown in FIG. 5, in some exemplary circumstances, a supported filter per se without disposing on the substrate 10 (i.e., line of the RAW FILTER in FIG. 5) may have a wide range of CWTS, or the bandpass center wavelength drift as shown in FIG. 5, (e.g., from about −0.032 nm to about 0.030 nm) with a linear trend within the industrial-grade range of operating temperature. In other words, the CWTS of the filter should be proportional to the temperature originally, but such optical property is changed once it is affected by external stress exerted by another component physically in contact with the filter. For instance, still illustrate in FIG. 5, in the circumstances that the filter is disposed on the substrate 10 (i.e., the line of ON TRAY in FIG. 5), the CWTS of the filter may have a narrower range (e.g., from about −0.030 nm to about 0.008 nm) with a non-linear trend within the same range of temperature; that is, the optical properties of the filter may be changed or adjusted by contacting another component, such as the substrate 10 and/or the first adhesive layer 41 there between.

Accordingly, in some embodiments of the present disclosure, the spacer 30 is attached to the first side surface 22 of the support body 21 by a second adhesive layer 42 on the first side surface 22. The spacer 30 is configured to compensate or to offset the optical property change of the filter disposed on the substrate 10. As the examples illustrated in the previous paragraph, no matter the filter 21 is disposed on the substrate 10 or not, the CWTS of the filter 21 under a low temperature is over about 0.020 nm, which means the filter 21 is relatively sensitive to the temperature, especially sensitive to low temperature. Considering that, the spacer 30 is utilized to "straighten" and/or "flatten" the trend of the CWTS within the specific range of temperature, and thus the CWTS of the filter 21 may be controlled within a preferred range, such as less than about 0.03 nm under the industrial-grade range of operating temperature, or further less than about 0.01 nm under such range of operating temperature. That is, generally, the CWTS over about 0.03 nm may not fulfill the industry requirement, while the embodiments in the present disclosure may control the CWTS less than about 0.03 nm, or even better, such as less than about 0.01 nm under the industrial-grade range of operating temperature.

In some embodiments, the spacer 30 is made by metal. In some embodiments, the spacer 30 is made by stainless steel. In some embodiments, a coefficient of thermal expansion (CTE) of the spacer 30 is in a range of from about 8 ppm/° C. to about 12 ppm/° C. In some embodiments, CTE is the primary parameter in determining which material of the spacer 30 is employed. For example, as illustrated in FIG. 5, once a first spacer having a first CTE is attached to the support body through the second adhesive layer (i.e., the line of WITH SPACER #1 in FIG. 5), the CWTS of the filter 21 may be optimized to fall within about 0.014 nm to about −0.018 nm under the operating temperature in a range of from about −40° C. to about 85° C. However, since the CWTS of the filter 21 under a low temperature is changed to a positive value while that under a high temperature is also significantly and reversely changed to a negative one, it is preferred to use a second spacer, which having a second CTE smaller than the first CTE, to acquire a flatter trend of the CWTS within the specific range of temperature (i.e., the line of WITH SPACER #2 in FIG. 5). By using the second spacer instead of the first spacer, the CWTS of the filter 21 may be controlled within a preferred range, and it is proved that the CWTS of the filter 21 can be adjusted by using a spacer having a suitable CTE coordinated to the filter.

Figure 6A:
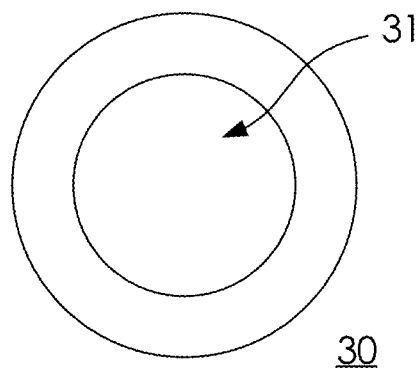
FIG. 6A illustrates a front view of a spacer according to some embodiments of the present disclosure.
Figure 6B:
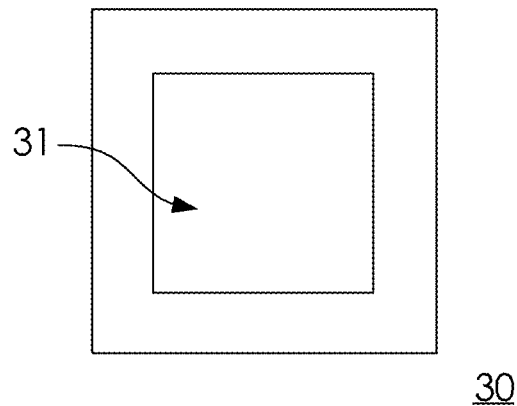
FIG. 6B illustrates a front view of a spacer according to some embodiments of the present disclosure.
Figure 6C:
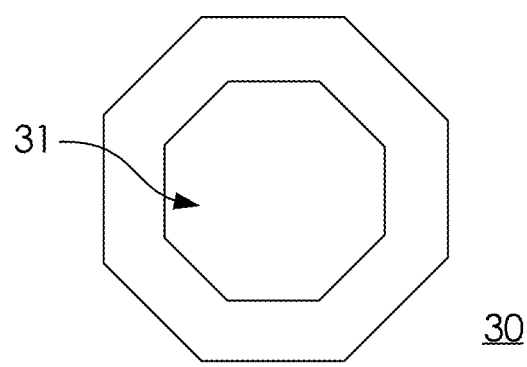
FIG. 6C illustrates a front view of a spacer according to some embodiments of the present disclosure.
Figure 7A:
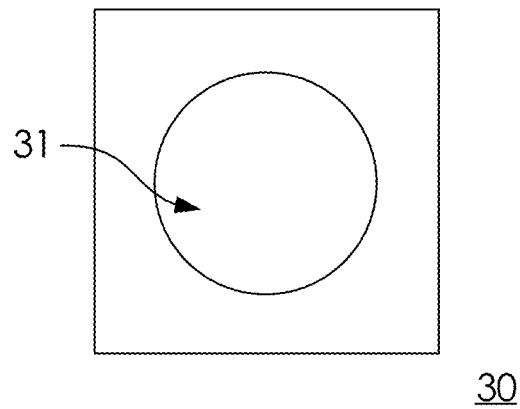
FIG. 7A illustrates a front view of a spacer according to some embodiments of the present disclosure.
Figure 7B:
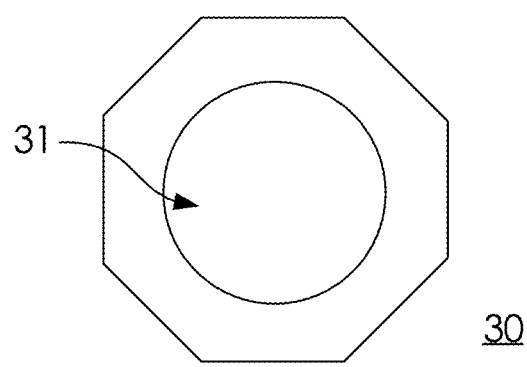
FIG. 7B illustrates a front view of a spacer according to some embodiments of the present disclosure.

In some embodiments, the spacer 30 is centrosymmetric, and a center portion of the first side surface 22 of the support body 21 is free from covered by the spacer 30. For example, as shown in FIG. 6A, the spacer 30 may be ring-shaped from a front view perspective, and thus the spacer 30 may have an opening 31 at the center portion thereof for light passing through. As shown in FIGS. 6B and 6C, in other examples, the spacer 30 may be square-shaped or polygon-shaped from a front view perspective, and also have openings 31 at the center portion thereof for light passing through. In other embodiments, the inner shape and the outer shape of the spacer 30 may be different, for example, as shown in FIGS. 7A and 7B, the inner shape of the spacer 30 may be a ring, but the outer shape of the spacer 30 may be square or polygon that aligned to the edges of the support body 21. Furthermore, by using the centrosymmetric spacer 30 shown in FIGS. 6A, 6C, and 7B, at least a peripheral portion (e.g., the four corner portions of the filter layer 24) of the filter layer 24 may be free from covered by the centrosymmetric spacer 30, such as the embodiment previously shown in FIG. 2.

In some embodiments, the spacer 30 is made by glass-ceramic. Since the glass-ceramic may be transparent or non-transparent, the spacer 30 may not have an opening at the center portion thereof in the circumstances that the spacer 30 is transparent. Furthermore, the shape of the spacer 30 made by transparent glass ceramics (TGCs) may be identical to the side of the support body 21, and such spacer 30 is easy to be attached to the support body 21. Like the spacer 30 made by metal, the CTE of the spacer 30 made by glass-ceramic is also in a range of from about 8 ppm/° C. to about 12 ppm/° C.

In other embodiments, the spacer 30 is non-centrosymmetric. For example, the spacer 30 may be triangle-shaped and have an opening at the center portion thereof for light passing through. In some embodiments, the non-centrosymmetric spacer is utilized to balance the stress in the support body 21. To be more detailed, since the support body 21 is fixed on the substrate by the first adhesive layer 41, at least the lower portion of the support body 21 is in contact with the first adhesive layer 41, and therefore the first adhesive layer 41 may induce stress in the support body 21 and affect the optical properties of the support body 21. Accordingly, in some embodiments of the present disclosure, the non-centrosymmetric spacer is utilized to balance the stress induced to the support body 21, hence the shape of the spacer 30 is corresponding to the stress source. As a result, the optical properties of the support body 21 may be adjusted to a preferred condition, such as the example that the CWTS is less than about 0.01 nm under the operating temperature in a range of from about −40° C. to about 85° C.

As previously mentioned, the first adhesive layer 41 is utilized to fix the support body 21 over the substrate 10, while the second adhesive layer 42 is utilized to fix the spacer 30 on a side surface of the support body 21, or to be more precisely, the second adhesive layer 42 is utilized to fix the spacer 30 in contact with the filter layer 24. In some embodiments, the material of the first adhesive layer 41 is identical to that of the second adhesive layer 42. In some embodiments, both of the first adhesive layer 41 and the second adhesive layer 42 include UV-curable adhesives or heat curing adhesives. In some embodiments, both of the first adhesive layer 41 and the second adhesive layer 42 include epoxy.

Figure 8:
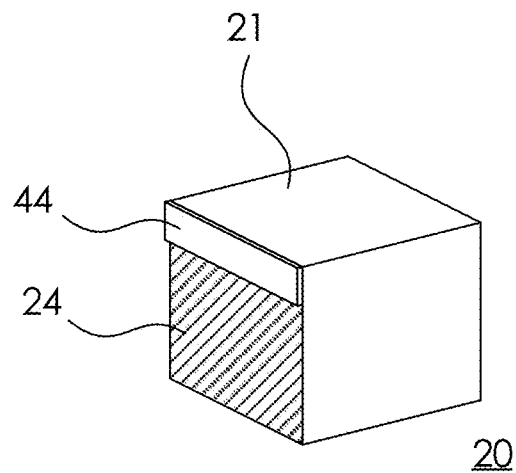
FIG. 8 depicts a three dimensional illustration of a filter according to some embodiments of the present disclosure.

Furthermore, the CWTS of the filter may be adjusted by employing an additional adhesive material on the support body 21 other than the first adhesive layer 41 and the second adhesive layer 42. In some embodiments, the additional adhesive material may be employed without utilizing the spacer. For example, as shown in FIG. 8, without using the spacer, a fourth adhesive layer 44 may be in contact with an upper side portion of the support body 21, and the fourth adhesive layer 44 is free from in contact with the first adhesive layer 41. In such embodiments, the fourth adhesive layer 44 is only for adjusting the optical property of the filter, and no other component is fixed on the support body 21 thereby. Generally, the fourth adhesive layer 44 is disposed on the side of the support body 21 having the filter layer 24 coated thereon. In some alternative embodiments, the fourth adhesive layer 44 may be disposed on other side of the support body.

Comparing to the optical performances of the raw filter and the filter disposed on the substrate with the first adhesive layer 41 only, the usage of the fourth adhesive layer 44 may cause a better stability of the CWTS within the specific range of temperature. As the analysis shown in previously mentioned FIG. 5, the support body 21 fixed on the substrate 10 by the first adhesive layer 41 and having the fourth adhesive layer 44 on a side (i.e., the line of WITH EPOXY in FIG. 5) may have a more linear trend of the CWTS than that of the raw filter (i.e., the line of RAW FILTER in FIG. 5) and the filter 20 disposed on the substrate 10 with the first adhesive layer 41 only (i.e., the line of ON TRAY in FIG. 5). However, the CWTS of the filter 20 with the usage of the fourth adhesive layer 44 under a low temperature is close to about 0.020 nm. In other words, the usage of the spacers 30 may provide a better optical performance than using the fourth adhesive layer 44 only.

Figure 9:
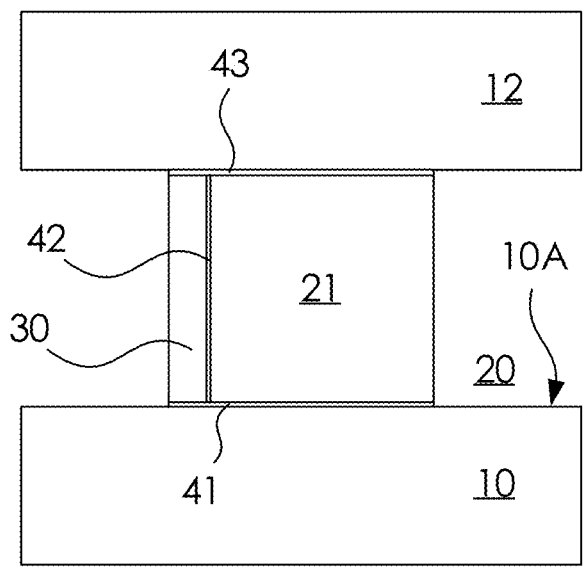
FIG. 9 illustrates a side view of a portion of an optical device according to some embodiments of the present disclosure.

As shown in FIG. 9, in some embodiments, the stress balance mechanism includes a capping substrate 12 disposed over the plurality of filters 20 by a third adhesive layer 43. The capping substrate 12 is also over a top side of the filter layer 24. In such embodiments, the material of the third adhesive layer 43 is identical to that of the first adhesive layer 41, while the capping substrate 12 may cover the whole top surface of the support body 21. The third adhesive layer 43 is in contact with the top surface of the support body 21, and thus being sandwiched by the support body 21 and the capping substrate 20. The capping substrate 12 and the third adhesive layer 43 are employed as the stress balance mechanism since the stress in the support body 21 may be induced from the first adhesive layer 41 and the substrate 10. That is, the first adhesive layer 41 and the substrate 10 may induce stress from the lower portion of the support body, and therefore the third adhesive layer 43 and the capping substrate 12 may induce stress from an opposite direction to compensate or to offset the optical property change of the support body 21. In some embodiments, the capping substrate 12 is a portion of a cover for packaging or sealing the optical device.

Figure 10:
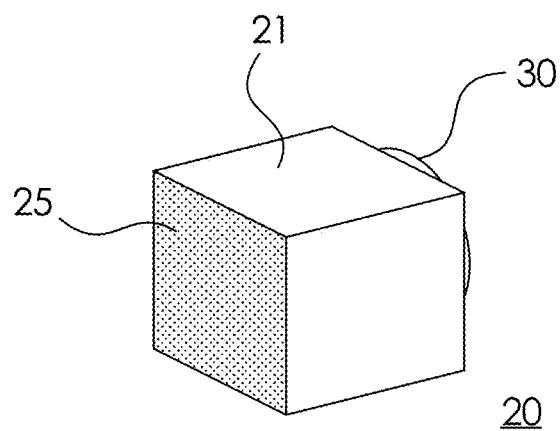
FIG. 10 depicts a three dimensional illustration of a filter according to some embodiments of the present disclosure.

As shown in FIG. 10, in some embodiments, the filter further includes an anti-reflection layer 25 coated on the support body 21. Generally, the anti-reflection layer 25 is coated on the second side surface 23 of the support body 21, which is opposite to the position of the filtering layer 24.

Figure 11:
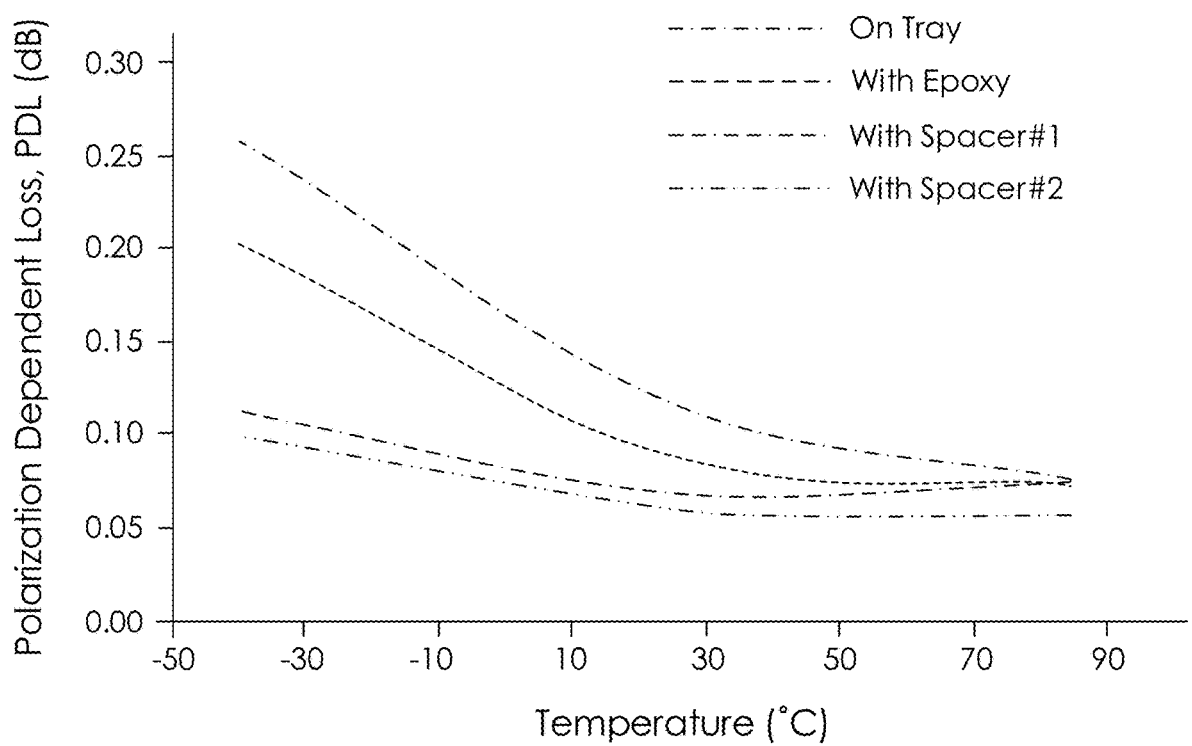
FIG. 11 illustrates a chart of PDL with respect to temperatures for various filters according to some embodiments of the present disclosure.

Except for the changes of the CWTS as previously shown in FIG. 5, by using the spacer 30 which provides adequate CTE to improve the optical performance under low temperature, the spacer 30 and other stress balance mechanisms may alleviate the PDL as well. For example, the PDL may be controlled to be less than about 0.1 dB under the specific operating temperature. As shown in FIG. 11, in the circumstances that the filter 20 is disposed on the substrate 10 (i.e., the line of ON TRAY in FIG. 11), the PDL is relatively high (e.g., over 0.1 dB) under the operating temperature in a range of from about −40° C. to about 40° C. Next, in the circumstances that the filter 20 is disposed on the substrate 10 and further laterally covered by the fourth adhesive layer 44 (i.e., the line of WITH EPOXY in FIG. 11), the PDL may be slightly alleviated in the abovementioned range of the operating temperature, but the PDL still over 0.1 dB under the operating temperature in a range of from about −40° C. to about 15° C. Further, by using the first spacer attached to the first side surface 22 of the support body 21 by the second adhesive layer 42 (i.e., the line of WITH SPACER #1 in FIG. 11), the PDL is significantly alleviated, for example, the PDL is less than 0.1 dB under the operating temperature in a range of from about −20° C. to about 85° C. On the basis of that, by using the second spacer attached to the first side surface 22 of the support body 21 by the second adhesive layer 42 (i.e., the line of WITH SPACER #2 in FIG. 11), since the second spacer having the second CTE smaller than the first CTE of the first spacer, the alleviation of the PDL may be further improved to be less than about 0.1 dB under the operating temperature in a range of from about −40° C. to about 85° C. That is, by using the spacers or other stress balance mechanisms, the PDL of the filter 20 may be alleviated, and a spacer having a specific CTE that properly cooperated to the support body 21 may provide a better alleviation of the PDL. In other words, the CTE of the spacer 30 is a critical factor in improving the optical property of the filter 20. In some embodiments, the preferred CTE of the spacer is in a range of from about 8 ppm/° C. to about 12 ppm/° C.

According to the present disclosure, an optical device is disclosed. Overall, the optical device may have a superior performance under a wide range of operating temperature with extremely low CWTS and PDL. The CWTS and PDL may be reduced or alleviated by using spacers having a CTE cooperate to the support body in the optical device, and/or further combined with other stress balance mechanisms to compensate or to offset the stress induced by the inevitable source of stress. Since the optical property of the filters in the optical device is improved and less sensitive to the temperature, the optical device may have a stable performance within the wide range of operating temperature, particularly, under a low temperature such as lower than 0° C.

In one exemplary aspect, an optical device is provided. The optical device includes a substrate and a plurality of filters. The plurality of filters are disposed over the substrate. Each of the filters includes a support body, a filter layer, and a centrosymmetric spacer. The support body has a first side surface and a second side surface opposite to the first side surface. The filter layer is on the first side surface. The spacer is attached to the first side surface by a second adhesive layer on the first side surface. The centrosymmetric spacer is attached to the filter layer, at least a peripheral portion of the filter layer is free from covered by the centrosymmetric spacer.

In another exemplary aspect, an optical device is provided. The optical device includes a substrate and a plurality of filters. The plurality of filters are over the substrate. Each of the filters includes a support body, a filter layer, a spacer, and a stress balance mechanism. The support body has a first side surface and a second side surface opposite to the first side surface. The filter layer is on the first side surface. The spacer is attached to the filter layer. The stress balance mechanism is attached to the support body.

In yet another exemplary aspect, an optical device is provided. The optical device includes a substrate and a plurality of filters. The plurality of filters are disposed over the substrate. Each of the filters includes a support body, a filter layer, and a spacer. The support body has a first side surface and a second side surface opposite to the first side surface. The filter layer is on the first side surface. The spacer is attached to the filter layer. Each of the filters has a bandpass center wavelength drift less than about 0.03 nm under a temperature range of from about −40° C. to about 85° C.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
a substrate; and
a plurality of filters disposed over the substrate, each of the filters comprises:
a support body having a first side surface and a second side surface opposite to the first side surface;
a filter layer on the first side surface; and
a centrosymmetric spacer attached to the filter layer, at least a peripheral portion of the filter layer is free from being covered by the centrosymmetric spacer.

2. The optical device of claim 1, wherein a coefficient of thermal expansion (CTE) of the spacer is in a range of from about 8 ppm/° C. to about 12 ppm/° C.

3. The optical device of claim 1, further comprising a first adhesive layer between the filter layer and the substrate, and a second adhesive layer between the centrosymmetric spacer and the filter layer.

4. The optical device of claim 3, further comprising a capping substrate over the top side of the filter layer by a third adhesive layer.

5. The optical device of claim 1, wherein the filter further comprises an anti-reflection layer on the second side surface of the support body.

6. The optical device of claim 1, wherein a center portion of the filter layer is free from being covered by the centrosymmetric spacer.

7. The optical device of claim 1, wherein the centrosymmetric spacer is transparent to an operating wavelength of the optical device.

8. An optical device, comprising:
a substrate; and
a plurality of filters over the substrate, each of the filters comprises:
a support body having a first side surface and a second side surface opposite to the first side surface;
a filter layer on the first side surface;
a centrosymmetric spacer attached to a side of the filter layer, and a portion of the side of the filter layer is exposed from the centrosymmetric spacer; and
a stress balance mechanism attached to the filter layer.

9. The optical device of claim 8, wherein the stress balance mechanism comprises a capping substrate over one of the plurality of filters.

10. The optical device of claim 9, wherein the capping substrate is a portion of a cover for packaging the optical device.

11. The optical device of claim 8, further comprising a first adhesive layer in contact with a lower side portion of the support body.

12. The optical device of claim 11, wherein the first adhesive layer is further in contact with the centrosymmetric spacer.

13. The optical device of claim 11, further comprising a fourth adhesive layer in contact with an upper side portion of the support body, and the fourth adhesive layer is free from being in contact with the first adhesive layer.

14. The optical device of claim 8, wherein the centrosymmetric spacer comprises glass-ceramic.

15. An optical device, comprising:
a substrate; and
a plurality of filters disposed over the substrate, each of the filters comprises:
a support body having a first side surface and a second side surface opposite to the first side surface;
a filter layer on the first side surface; and
a centrosymmetric spacer attached to the filter layer, and a portion of the side of the filter layer is exposed from the centrosymmetric spacer;
wherein each of the filters has a bandpass center wavelength drift less than about 0.03 nm under a temperature range of from about −40° C. to about 85° C.

16. The optical device of claim 15, further comprising an adhesive layer attached to the support body, and the adhesive layer is in contact with the filter layer.

17. The optical device of claim 16, wherein a lower portion of the centrosymmetric spacer and a lower side portion of the support body are in contact with the adhesive layer.

18. The optical device of claim 16, wherein the adhesive layer comprises epoxy.

19. The optical device of claim 15, wherein the centrosymmetric spacer comprises metal and having a coefficient of thermal expansion (CTE) in a range of from about 8 ppm/° C. to about 12 ppm/° C.

20. The optical device of claim 15, further comprising a stress balance mechanism attached to the filter layer of the filter.

* * * * *